GEORGE W. WILLARD
INVENTOR.

BY Warren T. Jessup
ATTORNEY

United States Patent Office 3,295,395
Patented Jan. 3, 1967

3,295,395
TRANSMISSION
George W. Willard, P.O. Box 902,
Springfield, Mo. 65801
Filed Mar. 30, 1964, Ser. No. 355,656
15 Claims. (Cl. 74—793)

This invention relates in general to the transmission of power, and relates more specifically to a mechanical transmission for the regulation of speed and the adjustment of the torque ratio.

In general my invention can be described in connection wtih any machine requiring:

(1) The regulating of speed, that is, where a definite speed ratio between the driving and driven component parts must be achieved and maintained; and (2) The converting of torque, where it is desirable for one reason or another to receive power at one angular velocity and torque, and to convert this same power to a different angular velocity and corresponding torque.

An object of my invention is to provide a mechanism whereby a relatively large amount of power may be transmitted at controlled velocities and torques within a range of speed above zero, the controlled speeds and torques being governed by a comparatively small application of force.

Another object of my invention is to provide a clutch or coupling mechanism whereby power from a driving means rotating at a high rate of speed and torque can be transmitted to a driven means having an initial velocity of zero. The application of power is at a controlled rate, thereby gradually and smoothly bringing the driven means up to its maximum speed, thus avoiding any sudden driving shock.

It is to be noted that the two above objects are directed to the same fundamental structure, but serving differing fields of application by a structural change in the form of an overrunning clutch.

Still another object of my invention is to provide a torque converter wherein the torque ratio between the driving and driven means can be changed without disconnecting the driving means from the driven means, with the result being an uninterrupted continuous flow of power from the driving means to the driven means during the time period of transition.

A further object of my invention is to provide a torque converter transmission mechanism of specific mechanical structure whereby the acting and reacting forces inherent within the transmission itself are utilized to lock and release a regulating and constraining means, thus varying both the torque ratio and the speed ratio.

A further object of this invention is to provide a torque converter transmission mechanism furnishing engine braking, thus preventing the driven mass from free wheeling when the driven mass momentarily becomes the driving means.

For a full understanding of the invention, a detailed description of the preferred embodiment of the transmission will now be given in conjunction with the accompanying drawings and the features forming the invention will then be specifically pointed out in the appended claims.

FIGURE 1A is a fragmentary section illustrating an alternate embodiment within the structure of FIGURE 1.

Figures 1, 2, 3:
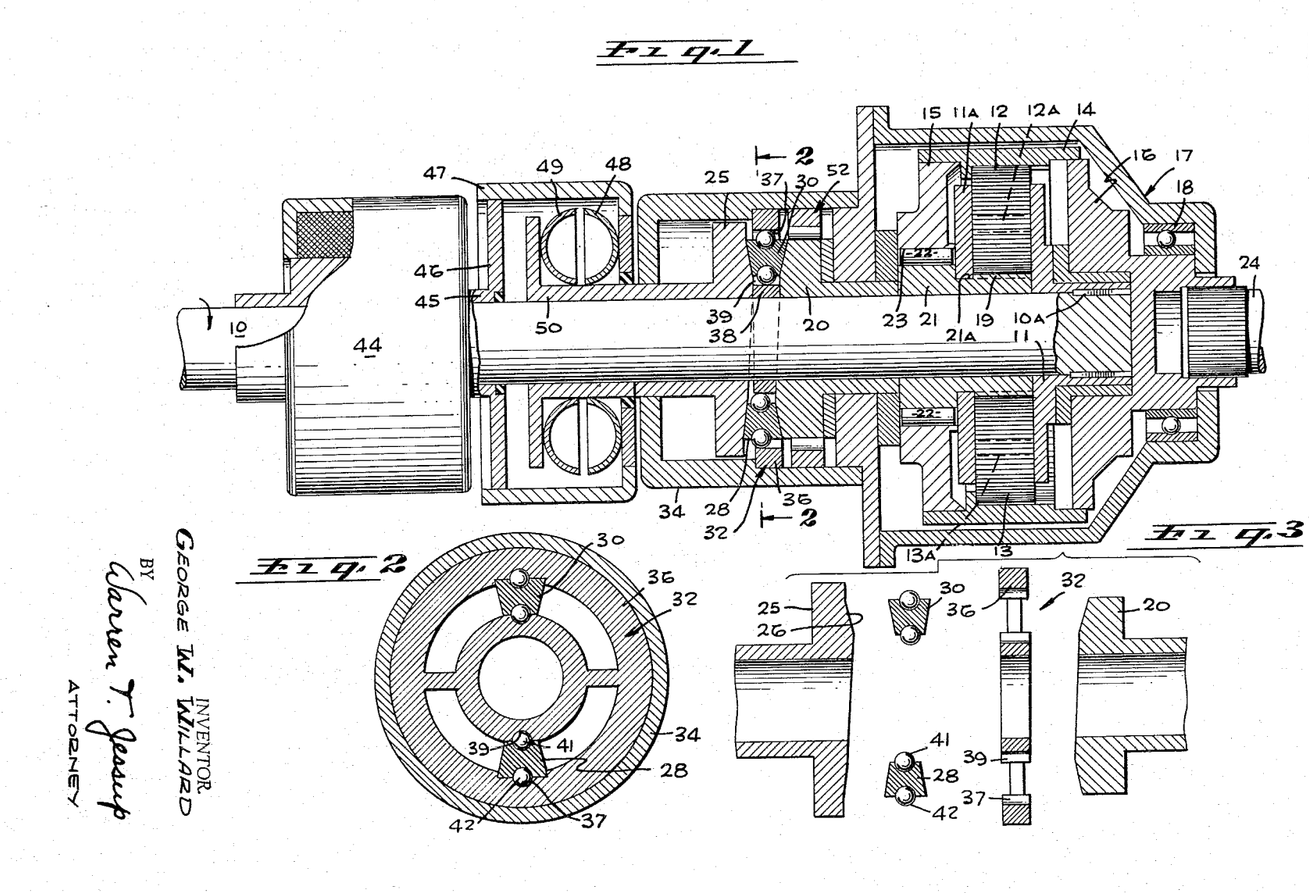
FIGURE 1 is a longitudinal section view through a preferred embodiment of the invention.
FIGURE 2 is a section view taken along line 2—2 of FIG. 1.
FIGURE 3 is an exploded view of the locking cam in the vicinity of the section line 2—2.

Referring to FIGURE 1, for a detailed explanation of the construction and operation of one embodiment of the transmission, there is illustrated a drive shaft 10. The drive shaft 10 is splined, at the far right end in FIGURE 1, as indicated by reference number 10A, to a pinion carrier 11. The pinion carrier 11 is journaled to rotate around the axis of the shaft 10, and is the supporting member of a plurality of pinion gears. Two pinion gears 12 and 13 are seen in FIGURE 1.

The pinion gears 12 and 13 are journaled on pins 12A and 13A and are therefore free to rotate around their axes and revolve around the axis of carrier 11, or both, as the situation might be.

The pinion gears 12 and 13 are in mesh with a ring gear 14. Ring gear 14 is supported by a left hand ring gear supporting member 15 and the right hand ring gear supporting member 16. The ring gear assembly 14 together with supporting members 15 and 16, is supported in a transmission case 17 by a roller bearing 18.

Also in mesh with the pinion gears 12 and 13, is a sun gear 19. The sun gear 19 is joined to, but could be otherwise made integral with, a locking cam 20 and the inner race 21 of that which will be described as an overrunning clutch.

For purposes of illustration, gear 19 and inner race 21 are shown as being a unitary structure. Pins 12A and 13A serve as drive transmission axles for pinions 12 and 13. A floating ring 11A is journaled on shoulder 21A to carry one end of pins 12A and 13A. The other ends are carried by carrier 11.

The unitary structure of gear 19 and the race 21 is then mechanically joined to the locking cam 20 by suitable means, not illustrated in this drawing. These three members operate as one and are journaled on the surface of shaft 10.

Overrunning clutch rollers 22 operate on the surface of race 21. The surface of the supporting member 15 is indicated by reference character 23, and cooperates with the rollers 22 and the race 21 to function as an overrunning clutch. Hence, surface 23 may be referred to as race 23. The overrunning clutch as employed in this illustration may be defined as one in which the inner race 21 will drive the outer race 23 when the inner race attempts to rotate in a selected specific direction at a speed faster than the speed of the outer race. The outer race, when rotating in the selected specific direction, will not drive the inner race, but will simply overrun.

Output from the transmission is by means of a driven shaft 24 which is splined to the right hand supporting member 16.

As thus far described, the cooperating members will be recognizable as a differential mechanism wherein the rotating drive force and speed of drive shaft 10 will rotate the pinion carrier 11 and cause the gears 12 and 13 to revolve in a fixed orbit around a central axis which is the axis of the driving shaft 10 and at the speed of the shaft 10. If it were not for the overrunning clutch in the form of the two race surfaces 21 and 23, together with the rollers 22, the ring gear 14 could be held against rotation by the work load or other means and thereby cause the sun gear 19 to revolve at the full calculated speed for the gear relationship. This situation is illustrated in FIGURE 1A to support the second object.

However, the overrunning clutch is provided in order that the torque can be altered and this would change that relationship. Assume for illustration purposes that the shaft 10 is rotating in a counterclockwise direction as viewed from the left end in FIGURE 1. This will cause the carrier 11 to revolve in the same counterclockwise direction. The gear 12 will recede away from the view and the gear 13 will come toward the observer in FIGURE 1. Hence, there will be a driving force upon both the ring gear 14 and the sun gear 19 to revolve in the same counterclockwise direction. Momentarily, as the drive shaft 10 is first started, there will be relative movement between the sun gear and ring gear, but in a fraction of a second, as the sun gear reaches the speed of the ring gear and attempts to proceed faster, the overrunning clutch action through the rollers 22 will cause the sun gear to lock to the left-hand ring gear support 15 and the entire transmission system will rotate in a 1–1 ratio. When used with an overrunning clutch the speed of the sun gear can equal but never exceed the speed of the driving shaft. The speed of the ring gear can never fall below the speed of the diving shaft.

It must be understood that the output from shaft 24 will drive through other gear reduction systems and clutching devices and will not be attached directly to a workload of enough resistance to stall the prime mover at full operating speed.

Therefore, this transmission is serviceable to increase the output speed of the shaft 24 above that of the input shaft 10 to cause an acceleration to full speed condition. This is accomplished by retarding the speed of the sun gear 19 from the arbitrary maximum through a range down to zero. For purposes of illustration this speed and the speed of shaft 10 will be 1,000 r.p.m. As this retarding takes place, the relative speed of the ring gear 14 will increase from the 1,000 r.p.m. speed up to a greater speed dependent upon the size ratio of the gears employed. Using a ratio of ring gear to sun gear of 2–1, a zero speed for the sun gear 19 will produce a 1,500 r.p.m. speed for the gear 14. Hence, this one transmission will operate to adjust the speed and power ratios within these limits.

By elimination of the overrunning clutch principle, keeping these parts separate to operate independently, the sun gear 19 could operate between 3,000 r.p.m. with the gear 14 standing at zero r.p.m., through to the condition of zero speed for the sun gear and a 1,500 r.p.m. speed for the ring gear 14.

The ring gear 14 is non-rotatably carried by the support 16, and the output drive shaft 24 is non-rotatably carried by that same support 16. Hence, regulation of the speed of the ring gear 14 will be a regulation of the output speed of driven shaft 24.

Therefore, according to the principles of this invention, regulation control or constraining of the locking cam 20 will be translated into torque and speed control of the driven shaft 24.

As set forth in the objects, this invention is provided to establish a new, improved, releasable, self-locking, regulating and constraining means to control this gear train through the locking cam 20.

Reference is made to United States Patent 2,847,876, wherein a transmission is set forth which will operate to adjust speed and torque of the output from zero to full speed, substantially as suggested in FIGURE 1A, and employing an operator adjustable clutch means arranged to slip at a pre-selected torque, and having the ability to slip continually without damage while transmitting at capacity. In that prior patent, the operating equivalent of the locking cam 20 was controlled by means of a magnetic particle clutch as well as a reaction clutch drive. Hence, the "regulating and constraining means" employs a source of power and a slip clutch. The source of power may be a direct drive from a primary driving source, or an independent drive. The slip clutch may be a magnetic particle clutch or other device, such as a fluid coupling clutch.

One embodiment of a new regulating and constraining means is shown in FIGURE 1, but better shown in detail in the FIGURES 2 and 3. The locking cam 20, as previously described, is non-rotatively secured to the sun gear 19 and coaxially journaled for rotary motion around the axis of driving shaft 10. A fly wheel 25 has a cam surface configuration indicated by reference character 26. The fly wheel and cam faces are coaxially journaled for rotary motion around the axis of drive shaft 10, and the cam surfaces 26 are thus placed in spaced adjacent and opposing relationship to the locking cam 20. A pair of cone shaped follower rollers 28 and 30 are interposed between the faces of the locking cam 20 and the cam surface 26.

In order to hold the cone shaped follower rollers 28 and 30 in proper relationship to the cooperating cam surfaces, a fixed supporting frame 32 is secured within a housing 34. For the construction of this frame 32, refer to FIGURE 3 and to the section view FIGURE 2. Frame 32 provides a limiting raceway for the cone rollers 29 and 30. An exterior track portion 36 of frame 32 has lateral grooves 37, and an inner track 38 has lateral guide grooves 39. Grooves 37 and 39 provide lateral tracks for bearing rollers 41 and 42 respectively.

Thus, the cone shaped follower rollers 28 and 30 are mounted in a stationary frame fastened to the housing 34 and are free to rotate around their own axis, but are held from revolution around the axis of the drive shaft 10.

Refer to FIGURE 2 where it is seen that the cam surface of locking cam 20 and the cam surface 26 do not follow a plane normal to the axis of the shaft 10. The axis of rotation of the conical followers 28 and 30 are offset as they are seen in FIGURE 1, as a result of this cam face configuration.

During operation, under conditions wherein the locking cam 20 is being rotated because of connection with the sun gear 19, and the releasing cam 26 is being rotated in an opposite direction, the follower rollers 28 and 30 will reciprocate longitudinally of the axis of shaft 10, but always in direction opposite to each other.

In FIGURE 1, the follower roller 30 is shown in a position to its extreme right hand position in its path of travel. From this position, it will begin to move in the opposite direction under drive by the locking cam 20. The follower roller 28 is correspondingly at its extreme left hand end of travel in its path and is about to be driven or repositioned by the releasing cam surface 26 in a direction to the right in FIGURE 1.

As thus far described, it will be seen that upon rotation of the locking cam and releasing cam in opposite directions and at the same velocity, the cone followers will reciprocate freely and allow the locking cam 20 with its attached sun gear 19 to be driven by the pinion gears 12 and 13 at any speed mechanically dictated by the speed of rotation of the pinion carrier and the relative speed of the ring gear 14. However, upon locking the fly wheel 25 and the cam surface 26 in a stationary condition, the locking cam 20 will be held against rotation, thereby providing a stationary track in the form of sun gear 19, for the pinion gears 12 and 13. Hence, the ring gear 14 is caused to revolve around the axis of shaft 10 at a speed greater than the speed of the shaft 10, according to known mechanical principles.

It is the characteristic of such a controlled gear train, that some degree of release intermediate the full stationary or full rotative condition for the releasing cam faces 26 will produce an intermediate output of the driven shaft 24.

Accordingly, this invention provides for a new regulating and constraining means which enables a controlled speed of the releasing cam surface 26. The speed control has two requisites: (1) a source of power, and (2) a slip clutch which can slip indefinitely without damage should the need arise.

In the FIGURE 1, a source of power for the speed control is shown as a small high speed fractional horse power electric motor 44. Motor 44 is designed with the diameter of its armature shaft enlarged sufficiently to be journaled on the drive shaft 10. Preferably, motor 44 is of the reversible type in order that it may be operated either clockwise or counterclockwise. Further, in some instances, it is desirable to provide speed control for this motor 44.

The output shaft of the electric motor 44 is indicated by reference character 45. This shaft 45 is connected to, through a flange 46, a fluid coupling cover 47 and thence to the driving torus 48, which constitutes half of a fluid clutch.

A driven torus 49 is carried by a sleeve 50. Therefore, drive output of the fluid clutch will tend to drive the sleeve 50 in the direction of the driving torus 48. As best seen in FIGURE 1, the sleeve 50 is in driving connection relationship to the fly wheel 25, and therefore operates the releasing cam surface 26.

In the event that the motor 44 is energized at a time whenever the cam 20 is stationary, there will be harmless slippage between the halves of the fluid drive. The torque transmitting capacity of the fluid clutch is designed to be less than the rated torgue capacity of the electric motor. It should be noted, that operation of the electric motor while the regulating and constraining means is not able to rotate, will nevertheless impose a turning effort upon the releasing cam surface 26.

This particular type of releasing drive is suitable for some installations where electrical power is available, but if desired, other means may be readily substituted. The prior patent referenced above refers to a mechanical drive system with a magnetic particle clutch in the gear train. This may be employed. There are other types of fluid couplings which operate upon fluid drainage principles. Those skilled in the art will readily provide other devices for driving the releasing cam faces as needed.

An overrunning clutch 52 interposed between the housing 34 and the peripheral surface of locking cam 20 prevents unintentional or undesired reverse operation of the locking cam 20.

OPERATION OF FIGURE 1

This transmission may be designed for operation of the drive shaft in either a clockwise or counterclockwise direction. For the purpose of illustration, a clockwise rotation, as indicated by the arrow at the input end of the drawing, is selected.

Although a differential gear train and planetary gear train are understood by those skilled in the mechanical arts, for the purpose of completeness of disclosure, a preliminary explanation with respect to planetary gear trains such as illustrated in FIGURE 1 will be of some benefit in understanding of this invention.

A planetary gear train has three general elements: (1) a sun gear; (2) a planet carrier and pinion; and (3) a ring gear.

The pinion gears are mounted on their axles and are supported in the pinion carrier. These pinion gears are free to rotate around their own axis and to revolve around the axis of a central or sun gear. The pinions are also in mesh with an outer gear called a ring gear. These gears are in mesh at all times and are never shifted into or out of engagement.

Because there are three elements, there are six basic modes of operation whereby planetary gears may be employed to achieve different results in regard to speed ratios and direction of motion:

*Case 1*

Pinion carrier the driving element
Ring gear the driven element
Sun gear the remaining element

*Case 2*

Pinion carrier the driving element
Sun gear the driven element
Ring gear the remaining element

*Case 3*

Sun gear driving element
Ring gear the driven element
Pinion carrier the remaining element

*Case 4*

Sun gear driving element
Pinion carrier the driven element
Ring gear remaining element

*Case 5*

Ring gear the driving element
Pinion carrier the driven element
Sun gear the remaining element

*Case 6*

Ring gear the driving element
Sun gear the driven element
Pinion carrier the remaining element As an actual example using the appropriate and known gear calculation in Case 1, assigning a specific speed 1,000 r.p.m. to the driver, and the ratio between the pitch diameter of the sun gear and the ring gear at 1 to 2, then the embodiment illustrated in FIGURE 1, which includes a connecting overrunning clutch between the sun gear and the ring gear, would possess the following speed ration relationship:

(1) With the carrier speed revolving 1,000 r.p.m. and the sun gear stationary, the ring gear would revolve 1,500 r.p.m.

(2) With the pinion carrier revolving 1,000 r.p.m. and the sun gear permitted to revolve 600 r.p.m., the ring gear would be losing 1 r.p.m. for every 2 r.p.m. of the sun gear which would make the ring gear speed 1,500 minus 300 or 1,200 r.p.m.

(3) With the pinion carrier revolving 1,000 r.p.m. and the sun gear permitted to revolve 1,000 r.p.m., the ring gear would be revolving 1,000 r.p.m. and would be driven through the connecting overrunning clutch.

In the event that the connecting overrunning clutch (21, 22, 23) between the sun gear and the ring gear is eliminated as shown in FIGURE 1A, and with the pinion carrier still driving at a speed of 1,000 r.p.m. it would be possible to increase the speed of the sun gear until its speed reaches 3,000 r.p.m. The speed of the ring gear would then be zero.

It is apparent that, by controlling the speed of the sun gear in Case 1, any speed between zero and 1,500 r.p.m. can be obtained for the ring gear. This relationship is condition upon the specific example of the sun to ring gear ratio of 1 to 2.

The transmission illustrated in FIGURE 1, with its connecting overrunning clutch, transmits power at one value of torque when operating at its highest speed ratio and transmits power at a greater value of torque when operating at its lowest speed ratio. It does, however, provide infinitely variable speed within its range of speed, during the time the torque ratios are being altered.

The fastest speed of the driven shaft 24 in relationship to the driving shaft 10 is obtained when the locking cam 20 is stationary, such as when the regulating and constraining means is inactive. With the regulating and constraining means inactive, the releasing cam surface 26 will be stationary and the locking cam 20 will be held from rotation under drive from the driving shaft 10 through its connection with the sun gear 19.

The driving shaft 10, under these conditions will drive the driven shaft 24 at a speed greater than its own. This driven speed will vary according to the relative diameters of the sun gear 19 and the ring gear 14.

In order to shift down, or narrow the speed ratio between the driving shaft 10 and the driven shaft 24, the electric motor 44 is energized. The electric motor drives the torus cover 47 and the driving torus 48 of the fluid coupling, and this in turn transmits motion to the driven torus 49 and thence to the releasing cam 26.

The releasing cam will begin to rotate in a counter-clockwise direction permitting the locking cam 20 to be rotated by the sun gear 19 under drive from the driving shaft 10. With the speed of the driving shaft 10 constant, the driven shaft will begin to slow down due to the load, as the speed of the sun gear 19 increases, until the sun gear 19 and the driving race 21 of the overrunning clutch are rotating at the same speed as the driven shaft 24. The speed of the driven shaft 24 can never fall below the speed of the sun gear 19 due to the driving effect of the overrunning clutch. Therefore, the driven shaft being under such conditions is driven through the inner race 21 of the overrunning clutch at a one-to-one ratio with the driving shaft 10.

In the event that the shaft 24 and the load it drives were to momentarily obtain a force from external sources and obtain a speed to become the driving means, there would be a reverse of torque within the transmission. The shaft 24 would then, by virtue of inertia, attempt to drive both the driving shaft 10 and the sun gear 19. The sun gear however, would be driven in a direction opposite that of the ring gear 14. The releasing cam 26 would prevent the sun gear 19 from being rotated in a counterclockwise direction because of the described construction. Hence the driven mass would not free wheel, and the power source for shaft 10 would provide engine braking.

The degree of engine braking would correspond to that furnished when the transmission is in its highest speed ratio, that is, when the locking cam 20 is stationary. This is one of the important operational features possessed by this invention. In addition to providing engine braking, it permits the operator to shift up instantly and vary the speed and torque, simply by momentarily slowing the prime mover, and without disconnecting the prime mover from the driven means. This can take place regardless of the engine speed.

Another method whereby the speed ratio between the driving shaft 10 and the driven shaft 24 can be increased is to bring the sun gear 19 to a gradual stop. This is accomplished by first de-energizing the electric motor 44 to stop the flow of power going to the releasing cam fly wheel 25. The releasing fly wheel 25 will not stop abruptly, however, because of the energy that has been stored in its mass. The releasing cam surface 26 never drives the locking cam 20, but only releases the locking cam 20 to rotate under the drive from the primary driving source, which is the drive shaft 10. The amount of force necessary to keep the fly wheel 25 rotating will be very small, and the stored energy mass thereof will permit the releasing cam surface 26 to slow down gradually. This slowing down of the releasing cam retards the speed of the locking cam 20 and its attached sun gear 19. As the sun gear 19 gradually slows, the ring gear 14 gradually speeds up. There will be a continuous transmission of power to the driven shaft 24, at an accelerated speed during this transition period.

The third method for increasing the speed ratio from a lower to a higher speed ratio is by using a rheostat to vary the resistance of the electric motor 44 causing the electric motor to slow down gradually. When the speed of the electric motor reaches its lowest operational speed the fly wheel may still continue to gradually lose speed until the releasing cam surface has come to a complete stop.

It must be noted that the drawings and description are all directed to the "Case 1" mode of operation. From this illustration all of the cases may be understood without specific illustration.

ALTERNATE EMBODIMENTS

In FIGURES 4–7 two alternate types of regulating and constraining means are illustrated that could be substituted for the type disclosed in FIGURES 1 through 3.

Figure 4:
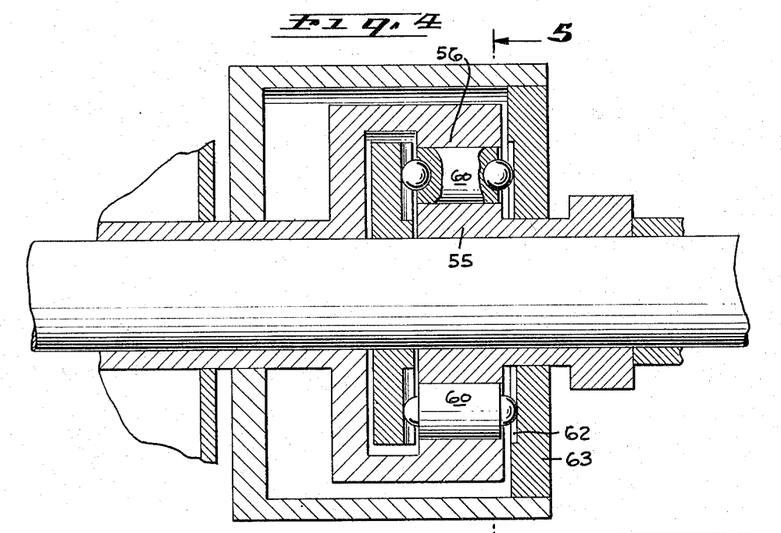
FIGURE 4 is a longitudinal section through an alternate embodiment of the regulating and constraining means of this invention.
Figures 5, 10:
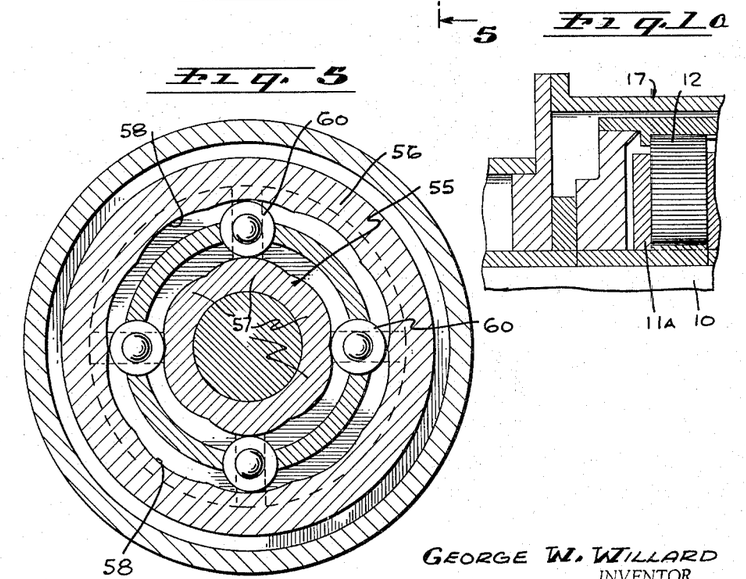
FIGURE 5 is a section taken along the line of 5—5 of FIGURE 4.
FIGURE 10 is perspective illustration of the cam structure of FIGURE 8.

In FIGURES 4 and 5 there is illustrated two coaxially aligned cylindrical cams. There is an inner cam 55 and an outer cam 56. In this case the inner cam is the locking cam, and the outer cam is the releasing cam. However, just the reverse of this could be true.

It can be seen from the drawing that the inner cam is divided into six equal sectors 57 of 60° each having convex apexes separated by depressions.

The outer cam 56, which in this case is the releasing cam, is divided into ten equal sectors 58 of 36° each. It will be noted that there are four cylindrical follower rollers 60 illustrated. The points of contact between the follower rollers and the respective cams are 90° apart. As in the illustration of the cone type follower rollers previously disclosed, the follower rollers are free to rotate around their own axes, but are held against revolving around the central axis of the driving shaft 10 by guide grooves 62 carried in a cover plate 63. The follower rollers, however, are free to be driven radially outwardly and inwardly by the two cams 55 and 56, provided that both of the cams are rotating at the correct speed, and preferably, in an opposite direction. If one or the other of the cams is not rotating, the other cam cannot rotate, because the follower rollers are not constructed to drive either cam.

It will be noted from the FIGURE 5 that the top and bottom follower rollers 60, that is, those diametrically opposite from each other, are at their greatest distance from the central axis, whereas the left and right-hand follower rollers are closest to the central axis.

When the outer cam 56 is under drive from its control means, it will have a tendency to drive the outer position follower rollers inwardly toward the central axis.

Since the guide grooves are stationary it is apparent that the points of contact between the follower rollers and the inner and outer cams always coincide with four common radii 90° apart.

The mean relative diameters of the two cams are such that when the inner cam is rotated one-sixth of a revolution the outer cam must be rotated one-tenth of a revolution. Under such conditions, the arcuate distance of the periphery of the two cams passing the contact points where the follower rollers are located, are equal. Therefore, if the inner cam is turning in a ratio of 10 r.p.m. to 6 r.p.m. with respect to the outer cam, the follower rollers will rotate around their axis as they are being driven inwardly and outwardly by the two cams. This construction produces more rolling friction than sliding friction, thereby reducing the amount of force necessary to rotate the releasing cam releasing the locking cam.

The object of this embodiment, as in the case of the cone type cams, is either to lock the locking cam, or to permit the locking cam to rotate by activating the releasing cam through its control means. When locked, the ring gear, under drive from shaft 10 will drive its connected driven shaft at a higher speed than the driving shaft 10. With the locking cam operating, the sun gear and its connected driving inner race 21 will speed up, because it offers a less resistance than the driven shaft 24. When the speed of a sun gear is equal to the speed of the driving shaft, it will drive the driven shaft at a one to one ratio. A flywheel effect, as described with respect to FIGURE 1, is also apparent in their embodiment. It has been found that spherical balls may be substitued for the cylindrical rollers without departing from the scope of this invention.

Figure 6:
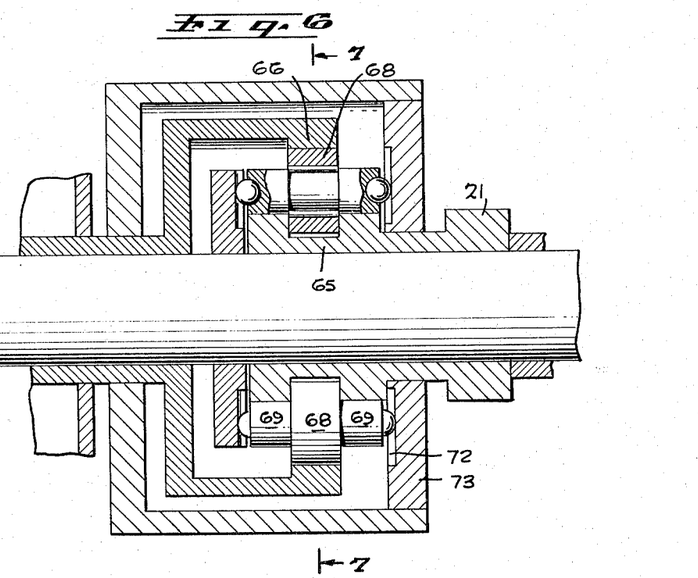
FIGURE 6 is a longitudinal section through a still further embodiment of the regulating and constraining means of this invention.
Figure 7:
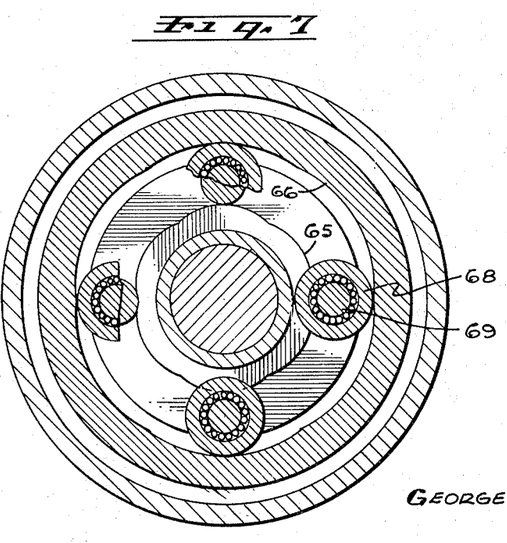
FIGURE 7 is a section taken along the lines 7—7 of FIGURE 6.

A third type of alternate regulating and constraining means is illustrated in FIGURES 6 and 7. This type is similar to the one illustrated in FIGURE 4 in that it has an inner cam 65 and an outer cam 66 co-axially aligned around a central axis, usually the axis of the driving shaft 10. Either one of the cams can be the locking cam and the other is then the releasing cam. In this illustration the inner cam 65 is the locking cam and would be joined to the sun gear 19.

The essential difference between the second and third type of regulating and constraining means is the provision in the third type of a secondary set of follower rollers 68 rotatively journaled on primary follower rollers 69.

The primary cylindrical follower rollers 69 are in contact with only one of the cams. In this case the primary follower rollers are in contact with the locking cam 65. The secondary set of follower rollers are in contact only with the outer cam 66.

The primary follower rollers are held from rotation around the central axis of the driving shaft 10 by guide grooves 72 in cover plate 73, but are free to rotate around their own axes, and to be reciprocally driven inwardly and outwardly by the driving efforts of the two cams.

In FIGURE 7 it will be noted that the outer cam 66 has the same number of sectors as the inner cam 65 which, in this case is six. It is not necessary however, that the cams have an equal number of sectors. However, the follower rollers operate in pairs, and when one of the follower rollers of a pair is being driven outwardly by the inner cam against the face of the outer cam, its mate is being repositioned in an inwardly direction by the outer cam.

The value of this particular arrangement is that the two cams can be driven either in the same direction, or in opposite directions in relationship to one another, and maintain a perfect rolling condition at their points of contact between the cams and their respective follower rollers.

Some of the qualifying structural differences in the new regulating and constraining means of this invention are hereafter restated:

(1) Two cams and their follower rollers co-axially aligned around a common central axis.

(2) Follower rollers are held from revolving around the common central axis, but are free to reciprocate back and forth and to rotate around their own axes.

(3) Follower rollers operate in pairs; one follower roller being driven in a direction away from the face of its driving cam and against the face of the second cam as the second follower roller is being driven in the opposite direction by the second cam against the face of the first cam. In commercial application there would preferably be more than one set.

(4) Each follower roller free to rotate around its own axis results in a true rolling motion in the relation of the two cams and the follower rollers when the locking cam and the releasing cam are rotating at the same speed.

(5) In the third type of regulating and constraining means the locking cam and releasing cam could operate in the same direction and at different speed in relationship to each other and still achieve the result of true rolling motion between the follower rollers and their respective cams.

(6) In the embodiment illustrated in FIGURE 1 the angles which the lines of contact between the faces of the locking cam and the releasing cam and the follower rollers make with the driving shaft 10 is one which result in perfect rolling of the follower rollers when the locking cam or releasing cam are rotating in opposite directions and at the same speed.

(7) Where light loads are being transmitted and controlled it is apparent that spherical balls could replace the follower rollers without departing from the scope of the invention.

Figures 8, 9, 10:
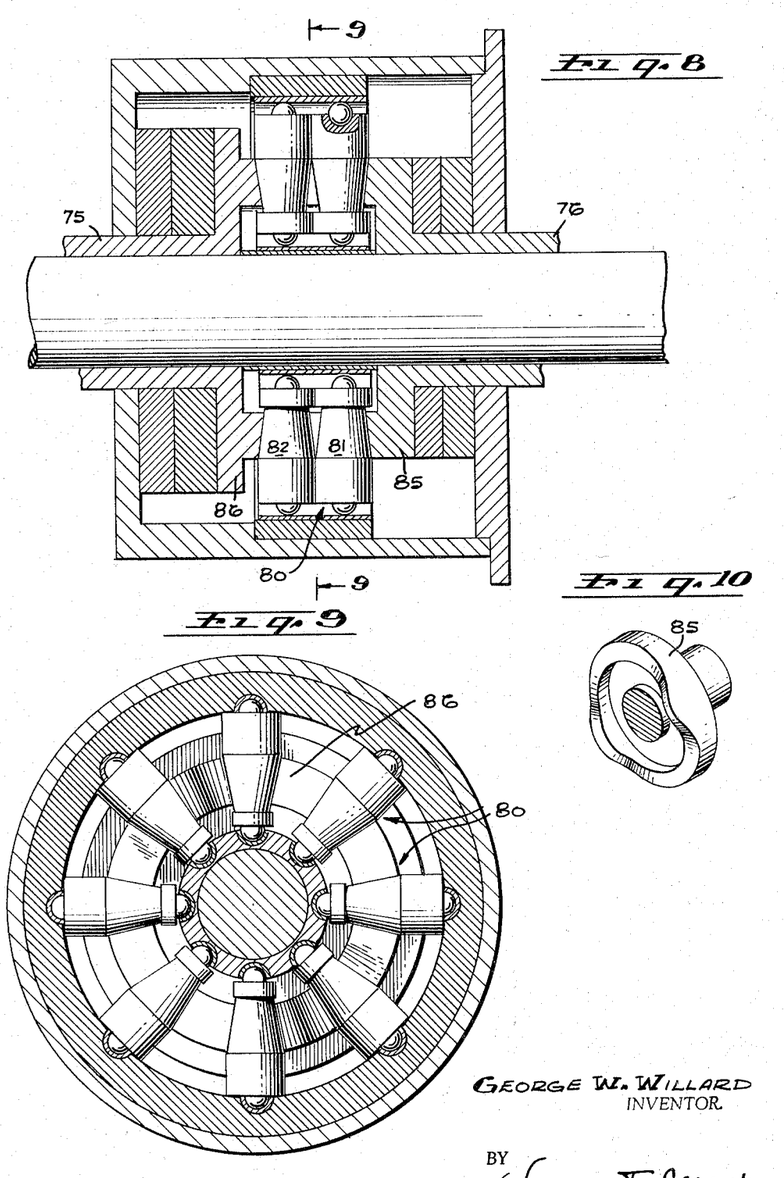
FIGURE 8 is a longitudinal section view through yet another modification of the regulating and constraining means of this invention.
FIGURE 9 is a section taken along the line 9—9 of FIGURE 8.

FIGURES 8 through 10 illustrate a fourth type of regulating and constraining means. In FIGURE 8 there is illustrated a sleeve 75 leading to a magnetic particle clutch (not shown) which substitutes for the electric motor and small fluid coupling illustrated in FIGURE 1. The input of the magnetic particle clutch is joined to the main driving shaft 10 while the output of the magnetic particle clutch is joined to the shaft 75.

A sleeve 76 leads to an overrunning clutch, such as clutch 21 illustrated in FIGURE 1. The magnetic particle clutch and the inner race 21 of the overrunning clutch are referred to in order that a co-relationship of the various components parts can be observed.

The primary objects of this embodiment are two in number: first, to permit the locking cam and the releasing cam to be rotated in the same direction at the same time and still achieve the true rolling motion of the follower rollers around their axes as the follower rollers are being reciprocated back and forth under the driving action of the two cams. Secondly, to provide a mechanism that prohibits, by locking, the operation of either cam unless the other cam is being driven in the same rotating direction.

It can be seen from the end view FIGURE 9, that there are a plurality of pairs 80 of follower rollers. It will also be noted in examining the longitudinal section view FIGURE 8, that each follower pair 80 is composed of two mated rollers 81 and 82. Therefore, in this embodiment, there is shown eight pairs of two each of identical follower rollers making sixteen identical follower rollers in all. It will be apparent as the mechanical structure of this embodiment is further disclosed that there could be a greater or lesser number of follower roller sets than the eight that is shown in these two views.

The mechanical structure of this embodiment is basically the same as the conical type illustrated in FIGURE 1 with the exception of the following three structural differences:

(1) Each follower roller is in contact with a second or mating follower roller. The follower rollers are identical in size and shape, being cylindrical on each end where they come in contact with one another, but cone shaped in their middle section where they come in contact with the faces of a locking cam 85 and a releasing cam 86.

The contour of the faces of the locking cam and the releasing cam shown in FIGURE 8 are similar to the contour of the faces of the two cams illustrated in FIGURE 1 in that they are alternately convex and concave (see FIGURE 10).

The faces of each of the two cams shown in FIGURE 9 are formed with two convex sectors diametrically opposite each other and two concave sectors diametrically opposite from each other. Cam 85 is illustrated in FIGURE 10. It will also be noted that while the contour of the faces of the two cams are identical, the convex sector of one cam is always opposite the concave sector of the other cam, and as the two cams are rotated at the same speed and in the same direction the lateral distance between their respective faces remains constant. This distance of course is the sum of the diameter of one set of contacting follower rollers.

(2) The second structural difference between the illustration of FIGURES 1 and 9 is that the locking cam and the releasing cam are designed to rotate in the same direction when operating. This direction of rotation could either be clockwise or counter clockwise. This permits the regulating cam to be directly driven from the main driving shaft 10 without the use of a reversing gear train interposed between the releasing cam and the slippable clutch.

(3) The third structural difference between the embodiment illustrated in FIGURE 1 and FIGURE 9 is in the significance of the number of follower rollers that can be employed in relationship to the number of convex and concave surfaces on each cam.

It has been previously mentioned in disclosing the operation of the embodiment illustrated in FIGURE 1 that the follower rollers operate in pairs. That is, that one of the follower rollers is being driven away from the face of one cam while the other follower roller is being driven in the opposite direction by the other cam. In the illustration of FIGURE 1 wherein the two cams rotate in the opposite directions, a limit is imposed by the number of convex and concave surfaces on the cam profile as to the number of follower rollers that may be employed. With one convex and one concave sector there can be only two follower rollers.

In the embodiment illustrated in FIGURE 1, in order to use eight follower rollers as shown in FIGURE 8, it would be required to increase the number of convex and concave sectors of each cam to a total of eight. If too large a number of convex and concave sectors are used, the rise and fall of the high and low places on the cam faces would be too steep for satisfactory operation.

In the embodiment illustrated in FIGURE 8 in which the cams are designed to rotate in the same direction, as many follower rollers may be employed as the diameter of the cams will permit, with the limitation that at least one concave and one convex sector, is provided for each cam. In FIGURE 8, however, it is illustrated as two convex and two concave sectors for each cam because this distributes the acting and reacting forces around the faces of the cam.

By using a large number of follower rollers, several of the follower rollers will always be in a locking position, making it impossible for the cams to operate other than in the same direction and at the same speed. This eliminates the necessity of the second overrunning clutch 50 illustrated in FIGURE 1 which is provided to prevent any undesirable backward motion between the cams at any time.

While the instant invention has been shown and described herein in what is conceived to be the most practical and preferred embodiments, it is recognized that departures may be made therefrom within the scope of the invention which is therefore not to be limited to the details disclosed herein but it to be afforded the full scope of the invention as hereinafter claimed.

What is claimed is:

1. In an epicyclic gear train power transmission having a power imput to said gear train, a work drive output from said gear train, and a remaining member, the speed of operation of the remaining member being the determinator of the speed and power ratio between the power imput and work drive output, the provision of an improved regulating and constraining means to provide control of said remaining member, said regulating and constraining means comprising:

a shelf-locking driven device connected to said remaining member, said driven device having the characteristic of holding the remaining member from rotation under drive of the transmission forces unless said driven device is operated from a second drive source;

said driven device having means including two matched cams formed and adapted to rotate with respect to one another in a speed ratio to produce a constant spacing therebetween, said constant spacing oscillating within fixed limits between the cams, one said cam driven by said remaining member and the other by a second drive source, and at least one follower roller gear means interposed therebetween for allowing one said cam to rotate under drive influence of said remaining member at a speed determined by the rotation speed of the other.

2. In a gear tarin transmission defined in claim 1, said imput being a drive shaft and said one cam driven by the remaining member being coaxially journaled upon said shaft with a peripheral edge defining a wave-form cam track;

said other cam being coaxially journaled upon said imput shaft and having a peripheral cam track edge;

two conical interconnectors mounted diametrically opposite one another in said cam track between the first and second cam and in drive relationship with both cams, said conical interconnectors being supported by mounting means adapted to provide a reciprocating path longitudinally of the imput shaft axis, but non-rotative around said shaft axis; and a second drive source means to drive said driven device cam in a direction releasing said remaining member to operate under drive from said power imput.

3. In the claim 2, each conical follower position being filled by two conical gears in side by side relationship, each gear having drive relationship with one only of the cams, and having separate portions interconnecting one another, whereby the cams may be driven in the same direction.

4. In an epicyclic gear train power transmission having a power imput to said gear train, a work drive output from said gear train, and a remaining member, the speed of operation of the remaining member being the determinator of the speed and power ratio between the power imput and the work drive output, the provision of an improved regulating and constraining means to provide control of said remaining member, said regulating and constraining means comprising;

a nest of two cam drums, one having an exterior cam surface and nested within the other having an interior cam surface;

a first roller member positioned between said cams, and a second roller member positioned diametrically opposite said first roller between said cams;

said cams having a mode of operation wherein the rotation of the two cams in a selected relative direction will produce a uniform spacing between the cams in the area of the interconnecting rollers and wherein the spread of rotation of either of the cams may be controlled and regulated by controlling and regulating the speed of the other;

a second drive source means to drive the restraining cam in a direction releasing the other cam to operate under drive from said power imput.

5. In the gear train defined in claim 4, said interior cam drum having a plurality of arcuate track segments and the interior cam surface of the other having mated arcuate cam surfaces.

6. In the gear train defined in claim 5, said arcuate cam surfaces being equal in number on the two cam drums.

7. In the gear train defined in claim 5, the arcuate cam surfaces of the cam drums being different in number.

8. In the gear train defined in claim 4, said roller members being composite rollers having an inner roller member riding upon the surface of one of the cam drums and having an outer cam roller journaled thereon and riding in contact with the other of said cam drums.

9. An epicyclic gear train power transmission having a power input to said gear train, a work drive output from said gear train, and a remaining member, the speed of operation of the remaining member being the determinator of the speed and power ratio between the power input and work drive output, the provision of a regulating and constraining means comprising:

a locking cam, a releasing cam, said cams being coaxially aligned around a common central axis with said remaining gear, a follower roller supporting means, a pair of follower rollers, said supporting means being provided with a plurality of guide grooves for the purpose of retaining said follower rollers thus permitting said follower rollers to rotate around their own axes and when operating to be reciprocatively driven by the said two cams but held by said supporting means from being rotatably driven by said two cams around a central axis, whereby the movement of said follower rollers are controlled by the rotation of said releasing cam and said releasing cam requiring no more power to drive it than is sufficient to overcome frictional resistance, and means to rotate said releasing cam in a direction releasing said first follower rollers to be driven by said locking cams.

10. In epicyclic gear train power transmission having a power input to said gear train, a work drive output from said gear train, and a remaining member, the speed of operation of the remaining member being the determinator of the speed and power ratio between the power input and the work drive output, the provision of an improved new regulating and constraining means, comprising:

(1) a locking cam and a releasing cam coaxially aligned around a common axis;
(2) each said cam having at least one convex surface and at least one concave surface;
(3) said surfaces opposed in cooperating relationship;
(4) at least two follower rollers interposed between said cam faces;
(5) said cam faces having an operative relationship such that one cam face may be driven by the said remaining member to drive the follower rollers, and the other cam face being releasable to maintain a given space relationship and permit the first cam face to rotate;
(6) each cam having at least one follower roller in contact with that said cam, and the follower rollers being spaced around the said common central axis;
(7) the drive relationship between said cams and the contacting follower rollers is such that the cams may drive the follower rollers but the follower rollers can not drive the cams;
(8) said cams formed and adapted to rotate with respect to one another in a speed ratio to produce a constant spacing therebetween;
(9) said follower rollers held against rotary motion around the said common axis;
(10) said follower rollers adapted to rotate freely around their own axis as they are being driven by corresponding drive cams, thereby reducing the amount of force necessary to release the locking cam; and
(11) the first of said follower rollers adapted to be driven by its respective drive cam in a direction away from the face of said drive cam and against the face of the second cam, and said second follower roller adapted to be driven by the second cam in a direction away from the face of said second cam and in the direction of the said first cam.

11. In an epicyclic gear train power transmission having a power input to said gear train, a work drive output from said gear train, and a remaining member, the speed of operation of the remaining member being the determinator of the speed and power ratio between the power input and the work drive output, the provision of a new and improved combination drive and regulating and control system comprising:

a directional driving means comprising a first element of said unidirectional driving means non-rotatively secured to said remaining member, a second element of said unidirectional driving means non-rotatively secured to said remaining member, a second element of said unidirectional driving means non-drive means to drive said output member when the speed of said first element is equal to the speed of said output member and when the output member is rotating in a predetermined direction, said second element of said unidirectional driving means adapted to drive said remaining member through said first element of said unidirectional driving means when said output member is rotating in a direction opposite to said predetermined direction and at a speed equal to the speed of said remaining member;

a regulating and constraining means driven by said remaining member, said regulating and constraining means including a locking cam driven by said remaining member, said locking cam being coaxially aligned with said central axis, a first follower roller driven by said locking cam in a direction away from the face of said locking cam, the drive relationship between said locking cam and said follower roller being such that while the cam may drive the follower roller the follower roller cannot drive the said locking cam, a releasing cam coaxially aligned around said central axis, a second follower roller driven by said releasing cam in a direction away from the face of said releasing cam, the drive relationship between said releasing cam and said second follower roller being such that said releasing cam may drive said second follower roller, but said second follower roller can not drive said releasing cam;

a second drive means, said second drive means comprising an engageable and disengageable clutch possessing the ability to slip continuously without damage while operating at capacity, a power source, an output shaft of said power source engageable with said shaft of said slip clutch, said output shaft to said slip clutch being in constant drive relationship with said releasable cam, therefore exerting a driving influence on said releasing cam at all times that the slip clutch is operating.

12. In an epicyclic gear train power transmission having a power imput to said gear train, a work drive output from said gear train, and a remaining member, the speed of operation of the remaining member being the determinator of the speed and power ratio between the power imput and work drive output, the provision of an improved regulating and constraining means to provide control of said remaining member, said regulating and constraining means comprising:

a self-locking driven device connected to said remaining member, said driven device having the characteristic of holding the remaining member from rotation under drive of the transmission forces unless said driven device is operated from a second drive source;

said driven device having two matched cams coaxially aligned around a common central axis; said cams adapted to rotate with respect to one another in a speed ratio to produce a constant spacing there between, one said cam driven by the remaining member and the other by a separate drive source, at least two followers interposed between the two said cam faces, said two followers held against revolving around said central axis, a first follower being adapted to being driven away from the face of the first said cam against the face of the second said cam, thereby providing a positive mechanical locking means when said remaining member is operating in a predetermined, specific direction;

said second follower being adapted to be driven away from the face of the first said cam and against the face of the second said cam when the remaining member is operating in a direction opposite to said predetermined, specific direction, thereby providing a positive mechanical locking means when said remaining member is operating in a direction opposite to said predetermined, specific direction.

13. In the claim 2, each conical follower position being filled by two conical gears in side by side relationship, each gear having drive relationship with one only of the cams, thereby permitting said cams to be operated in the same direction or permitting said cams to be operated in different respective directions.

14. A power transmission, comprising:
   a differential device including:
      (1) two differential gear members,
      (2) a rotatable pinion support, and
      (3) a differential pinion member journaled in said pinion support and meshing with said two gear members;
   a driving element rotating one of said members;
   a driven element rotated by one of said members;
   a regulating and constraining means driven by the remaining member;
   said regulating and constraining means having a first cam driven by said remaining member, a second cam, said first and second cams having complementary opposing face formation means for providing a space of uniform dimension between the said cams as one is rotated and the other follows, and said uniform dimension oscillating within fixed limits between the cams; a follower roller member positioned between said cams and locked in drive relationship with both cams, means to restrain said following roller member against revolving movement and providing rotatable support in a path of said fixed oscillation, whereby the interconnection through the cams will not transmit a drive force from one to the other but will allow one to be driven from a drive influence only to the extent and speed the second is rotated from another drive influence, and means to release said second cam at a controlled rate between limits of a stopped condition and a maximum speed.

15. In an epicyclic gear train power transmission having a power imput to said gear train, a work drive output from said gear train, and a remaining member, the speed of operation of the remaining member being the determinator of the speed and power ratio between the power imput and work drive output, the provision of an improved regulating and constraining means to provide control of said remaining member, said regulating and constraining means comprising:
   a self-locking driven device connected to said remaining member, said driven device having the characteristic of holding the remaining member from rotation under drive of said transmission forces unless said driven device is operated from a second drive source, said driven device having means including two matched cams formed and adapted to rotate with respect to one another in one speed ratio to produce a constant spacing therebetween, said constant spacing oscillating within fixed limits between the cams, one said cam driven by said remaining member and the other by said second drive force, whereby at least one gear follower interposed therebetween will allow said one cam to rotate under drive influence of said remaining member at a speed determined by the rotation speed of the other;
   a second drive force means to drive said driven device in a direction releasing said remaining member to operate under drive from said power imput, said sec-second drive force including an adjustable clutch means arranged to slip at a preselected amount of torque and having transmitting capacity to operate the driving device and the ability to slip continually without damage while transmitting at capacity.

References Cited by the Examiner

UNITED STATES PATENTS

| 2,390,626 | 12/1945 | Szekely | 74—782 X |
| 2,830,685 | 4/1958 | Humphrey | 192—30 X |
| 3,037,399 | 6/1962 | Gindroz | 74—675 X |
| 3,088,335 | 5/1963 | Bullard | 74—675 |

FOREIGN PATENTS

| 385,181 | 3/1908 | France. |

DAVID J. WILLIAMOWSKY, *Primary Examiner.*

J. R. BENEFIEL, *Assistant Examiner.*